Jan. 22, 1957     R. J. HESSION     2,778,042
APPARATUS FOR CLEANING POTATOES
Filed Nov. 12, 1952     3 Sheets-Sheet 1

INVENTOR
R. J. Hession
BY
Ben Cohen
ATTORNEY

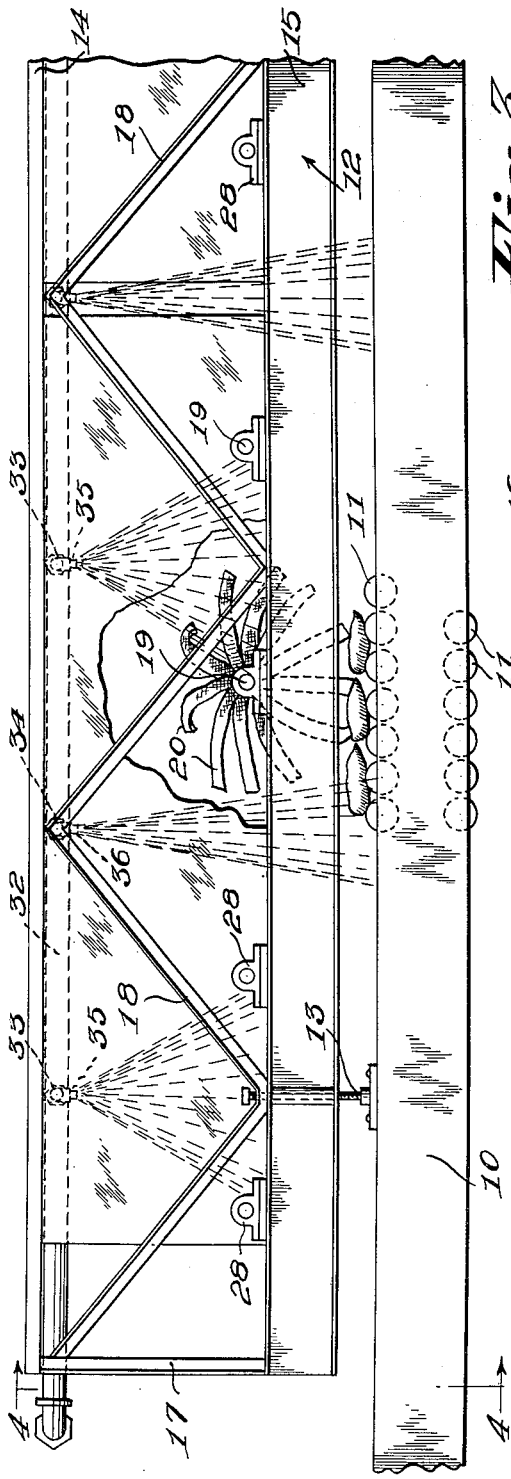
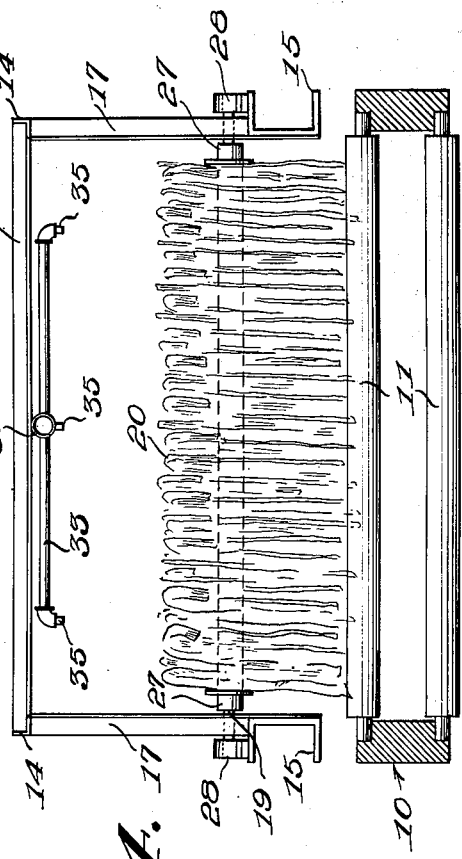

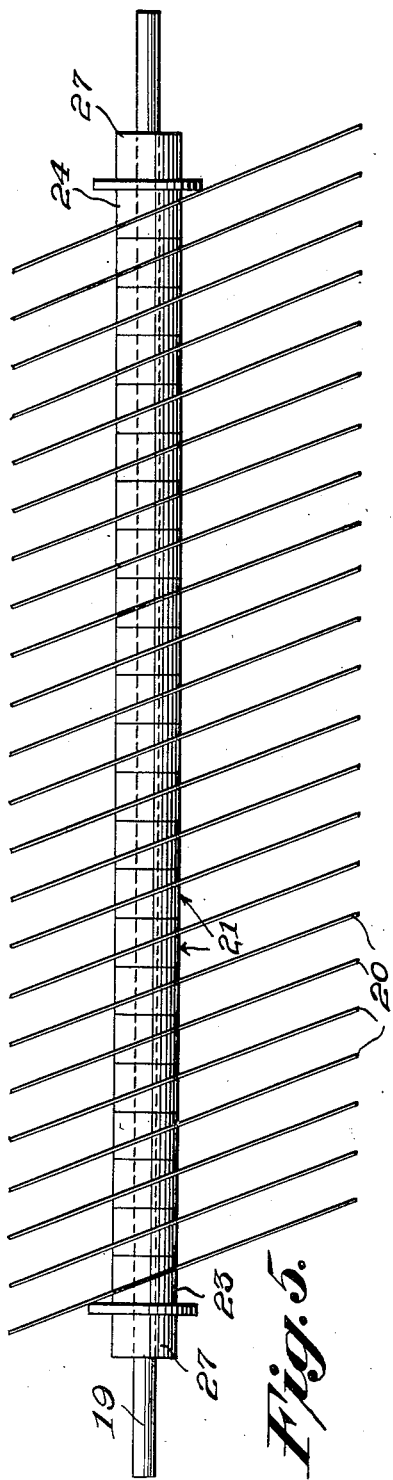

United States Patent Office 2,778,042
Patented Jan. 22, 1957

2,778,042
APPARATUS FOR CLEANING POTATOES

Rodney J. Hession, New Orleans, La.

Application November 12, 1952, Serial No. 319,978

1 Claim. (Cl. 15—3.14)

The present invention relates generally to apparatus for cleaning potatoes and the like and is particularly useful in connection with the commercial preparation for market of freshly picked potatoes.

Although the present invention is useful in treating all kinds of potatoes, it is particularly useful in the treating of sweet potatoes because of the various problems met in the cleaning of sweet potatoes. The present most common machine for washing and cleaning potatoes to remove undesirable foreign matter comprises parallel rotatable cylindrical members, usually brush rolls, which rub, scrub or brush the potatoes as they pass over said members transversely of their axes of rotation. Machines of this type have not heretofore been satisfactory because of the damage done to the skin of the potato. It is clearly apparent that the action of the potatoes, riding on top of rotating brushes, will cause skinning or brush-burning, particularly in the case of medium or large size potatoes since the weight of the potato is against the revolving brush.

Since the washed potatoes are generally stored for a period of time prior to shipping, and since there is always a small percentage of potatoes carrying black rot spores, there is a tendency for this small percentage to infect the clean stock because of the perforated condition of the skin caused by brush cleaning. To overcome this defect, the present routine in handling sweet potatoes is to store them in dirty condition and as soon as they are ready for market, to wash them and ship immediately after washing. This method is open to serious objection because the storage of dirty potatoes increases the spread of rot and makes it difficult to fill a large shipping order.

The primary object of the present invention is to provide an improved apparatus for subjecting potatoes to a thorough cleaning without damaging the skin of the potatoes by perforating the skin or by brushburning.

A further object of the invention is to provide an improved apparatus in which the potatoes are advanced through the machine automatically and expeditiously in such a way that all of the surfaces of each individual potato are frictionally acted upon effectively and uniformly.

Other objects and novel features and advantages will become apparent from the following description taken in connection with the accompanying drawings which illustrate a practical form of apparatus embodying the invention, it being understood that the description of this specific embodiment is merely illustrative and not restrictive and that various changes in arrangement and details of construction can be made without departing from the spirit of the invention.

These objects are accomplished, in accordance with the principle of the invention, by apparatus which comprises a roller type conveyor table made up of a plurality of approximately three inch diameter wood rollers that form an endless carrier, overhead buffers properly spaced above the rollers and rotating in a direction counter to the direction of rotation of the rollers, together with a system of spray nozzles mounted above the rollers for effectively distributing the cleansing fluid.

In order to further explain the principles of the invention, a practical embodiment of the invention is shown in the accompanying drawings and described in detail as follows:

In the drawings:

Figure 3 is a side view of the upper left half section of the apparatus.

Figure 4 is a sectional view taken on the line 4—4 of Figure 3.

Figure 5 is an elevational view of one of the buffer rollers.

Figure 6 is a detail view showing the manner of forming the spacers between buffers.

Figure 7 is an end view thereof.

Figure 8 is an end view showing the manner of forming a buffer disc.

Figure 1:
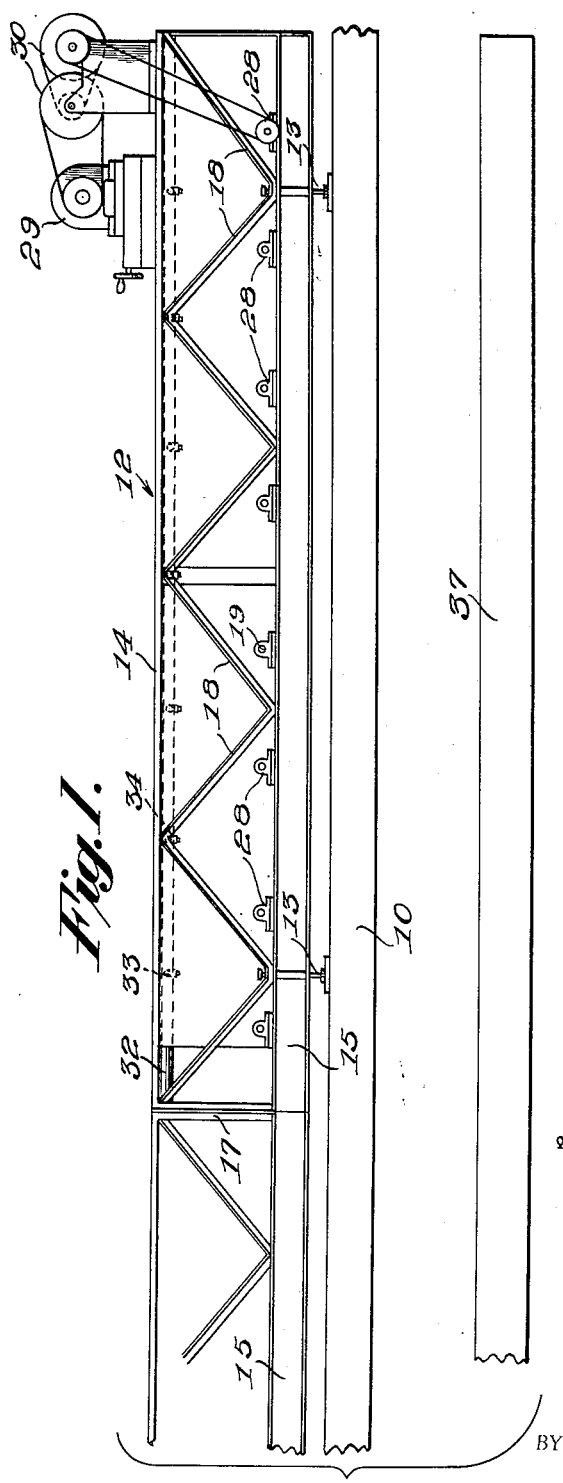
Figure 1 is a side view of the upper right half section of the apparatus forming the subject matter of the present invention.

Referring to Figures 1 and 3, which combined, form a side view of the apparatus, reference numeral 10 designates generally a standard type of endless roller conveyor, each of the rollers 11 being formed of wood of approximately three inch diameter and being closely spaced for conveying the product to the right as viewed in Figures 1 and 3. It will be understood that the roller conveyor is supported on a suitable framework, not shown, for elevating the conveyor to a proper height off the ground.

A rigid open framework 12 is supported above the conveyor on posts 13 which are made vertically adjustable for raising or lowering the frame 12. The framework 12 is of open construction consisting of upper and lower horizontal bars 14, 15, transverse bars 16, vertical bars 17 and diagonal reinforcing bars 18.

Each of the potato buffing means comprises a shaft 19 upon which are secured individual buffing elements each consisting of a strip of sail cloth, rubber or the like fabric 20, each strip being about three inches wide and fifteen inches long with a central aperture for mounting on the shaft. As shown three of the strips 20 are superimposed upon each other, extending at an angle one relative to the other to form a buffing set as clearly shown in Figure 8. Each set is separated from each other by a cork spacing element 21 so arranged that each set of buffing elements is slightly inclined from the vertical as seen in Figure 5. Although the drawing discloses the use of three strips, it will be understood that more than three strips could be used if desired.

A simple arrangement for effecting this inclination is shown in Figures 5 and 6. A cylindrical section of cork 22 is cut on a diagonal plane to form two equal sections 23, 24, each having a vertical face 25 and an inclined face 26. By transposing the sections whereby the vertical faces bear against each other, a spacing element 21, as seen in Figure 5, is obtained. One of the elements 23 forms the spacer at one end of the shaft and the other element 24 forms the spacer at the other end of the shaft as seen in Figure 5. A pair of sleeves 27 retain the washers and buffing strips on the shaft 19.

A plurality of shafts 19 with the buffing elements mounted thereon are mounted transversely of the framework 12 and rotatably supported in trunnions 28 suitably secured to the lower bars 15. As seen in Figures 1 and 3, the shafts 19 are arranged in pairs with approximately fourteen inches between the shafts of one pair and eighteen inches between the adjacent shafts of adjacent pairs for a purpose to be described.

Figure 2:
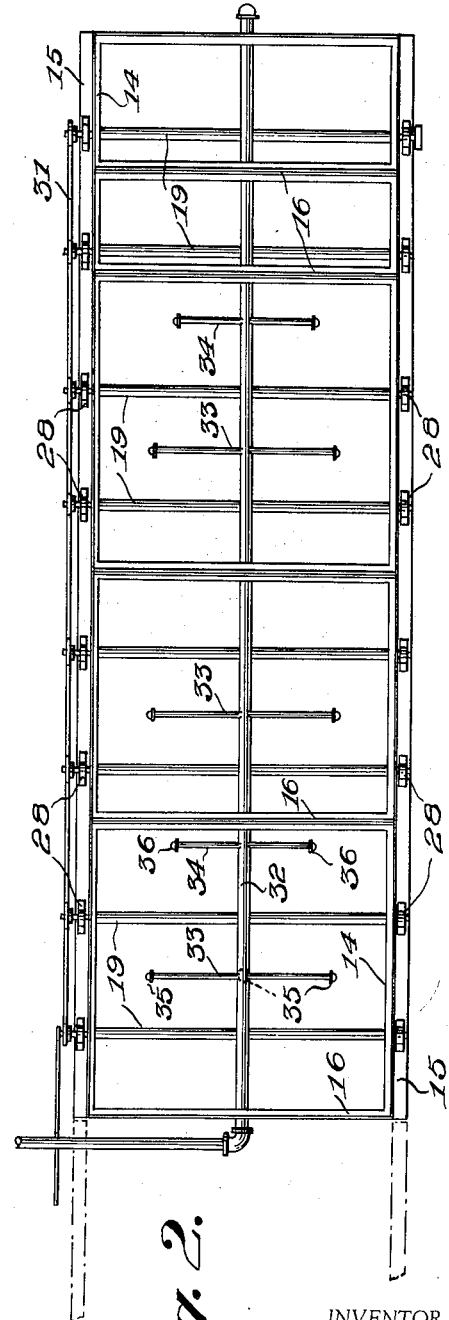
Figure 2 is a top plan view of this section with the motor omitted.

As seen in Figures 1 and 2, a motor 29 is suitably supported above the framework 12 and through a system of pulleys generally indicated by numeral 30, rotates the last of the buffer shafts which in turn is connected to any suitable means 31 for rotating all of the shafts 19.

The fluid suplying system consists of an overhead pipe 32 extending longitudinally and mounted within the framework 12 as seen in Figure 2. A plurality of jet carrying pipes 33 and 34 are transversely mounted on the pipe 32 to supply water or other cleansing fluid to the potatoes being cleaned. Each pipe 33 is spaced directly above and between a pair of shafts 19 while each pipe 34 is spaced above and between the shafts of adjacent pairs of shafts. It will be noted that pipe 33 is slightly longer than pipe 34. Each of the pipes 33 carries three evenly spaced square jet spray nozzles 35 and each of the pipes 34 carries two V jet spray nozzles 36. The spray nozzles 35 and 36 are so arranged to cover the entire width of the conveyor. The water from the three square jet nozzles above each pair of buffers keeps the buffers well washed down and the water from the two V jet nozzles hitting directly upon the potatoes knocks the dirt loosened by the buffers down through the rollers. A water recovery trough 37 can be provided below the rollers to collect the water whereby the water after proper filtering can be reused.

As previously pointed out, the buffers turn counter to the direction of rotation of the rollers. Although Figure 3 shows the sweet potato with the point of the potato forward, during the actual cleaning operation, the long part of the potato is parallel to axes of the roller. This ensures complete cleaning of the potatoes.

It will be apparent from the foregoing description that the present apparatus is well adapted to thoroughly wash and clean potatoes without injury to the potatoes. The gentle buffing of the potatoes by the moist buffing elements removes the dirt and disease spores without injury to the skin of the potato which is the primary source of rot and infection. The simplicity of the machine enables ready replacement of work parts and simplifies the ready application of disinfectant when deemed necessary.

Having thus described the invention, what is claimed is:

A potato cleaning machine comprising a table, conveyor means mounted on said table for rotating and advancing the potatoes, said conveyor consisting of a plurality of closely spaced transverse rollers, a plurality of spaced buffing members mounted for rotation above the table and adapted to buff the potatoes advancing on the table, said buffing members rotating in a direction opposite to the direction of the rollers, each of said buffing members comprising a shaft and a plurality of groups of fabric strips spaced along said shaft, each group consisting of several strips angularly mounted with respect to each other, the strips in each group lying in a plane inclined with respect to the plane of the table, and a plurality of liquid spraying devices mounted above the buffing members with some of the liquid spraying devices mounted between spaced buffing members whereby the fluid is directed against the potatoes being advanced.

References Cited in the file of this patent

UNITED STATES PATENTS

| | | |
|---|---|---|
| 1,357,794 | Moe | Nov. 2, 1920 |
| 1,399,412 | Sternad | Dec. 6, 1921 |
| 2,073,837 | Ghent | Mar. 16, 1937 |
| 2,233,611 | Hollenbeck | Mar. 4, 1941 |
| 2,476,537 | Erickson | July 19, 1949 |
| 2,543,915 | Leonard | Mar. 6, 1951 |